US011659166B2

(12) United States Patent
Jang et al.

(10) Patent No.: US 11,659,166 B2
(45) Date of Patent: May 23, 2023

(54) METHOD AND APPARATUS FOR CODING IMAGE BY USING MMVD BASED ON CPR

(71) Applicant: LG Electronics Inc., Seoul (KR)

(72) Inventors: Hyeongmoon Jang, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/416,913

(22) PCT Filed: Jan. 2, 2020

(86) PCT No.: PCT/KR2020/000024
§ 371 (c)(1),
(2) Date: Jun. 21, 2021

(87) PCT Pub. No.: WO2020/141884
PCT Pub. Date: Jul. 9, 2020

(65) Prior Publication Data
US 2022/0070440 A1    Mar. 3, 2022

Related U.S. Application Data

(60) Provisional application No. 62/787,753, filed on Jan. 2, 2019.

(51) Int. Cl.
*H04N 19/105* (2014.01)
*H04N 19/46* (2014.01)
(Continued)

(52) U.S. Cl.
CPC ......... *H04N 19/105* (2014.11); *H04N 19/132* (2014.11); *H04N 19/137* (2014.11); *H04N 19/176* (2014.11); *H04N 19/46* (2014.11)

(58) Field of Classification Search
CPC .. H04N 19/105; H04N 19/132; H04N 19/137; H04N 19/176; H04N 19/46
(Continued)

(56) References Cited

U.S. PATENT DOCUMENTS

2016/0100163 A1    4/2016  Rapaka et al.
2021/0152845 A1*   5/2021  Liu ...................... H04N 19/196
(Continued)

FOREIGN PATENT DOCUMENTS

KR    1020160063996    6/2016
KR    1020170047234    5/2017
(Continued)

OTHER PUBLICATIONS

Samsung Electronics Co., Ltd., "CE4 Ultimate motion vector expression in J0024 (Test 4.2.9)," JVET-K0115-v4, Joint Video Experts Team (JVET) of ITU-T SG 16 WP 3 and ISO/IEC JTC 1/SC 29/WG11, 11th Meeting, Ljubljana, SI, Jul. 10-18, 2018, 9 pages.

*Primary Examiner* — Albert Kir
(74) *Attorney, Agent, or Firm* — Fish & Richardson P.C.

(57) ABSTRACT

A method for decoding an image by a decoding apparatus comprises the steps of: obtaining merge with motion vector difference (MMVD) flag information of a current block from a bit stream; determining whether or not the current block is a current picture referencing (CPR) coding block; if the current block is a CPR coding block, deriving base motion information; deriving motion information of the current block on the basis of the base motion information; generating prediction samples of the current block on the basis of the motion information; and generating reconstruction samples of the current block on the basis of the prediction samples, wherein the MMVD flag information indicates whether or not motion information is derived when the MMVD is applied to the current block, and the CPR coding
(Continued)

block is a block coded by using a current picture including the current block as a reference picture.

14 Claims, 10 Drawing Sheets

(51) Int. Cl.
    *H04N 19/513*     (2014.01)
    *H04N 19/132*     (2014.01)
    *H04N 19/137*     (2014.01)
    *H04N 19/176*     (2014.01)

(58) Field of Classification Search
    USPC .................................................. 375/240.02
    See application file for complete search history.

(56) References Cited

U.S. PATENT DOCUMENTS

| | | | |
|---|---|---|---|
| 2021/0203945 A1* | 7/2021 | Liu | H04N 19/132 |
| 2021/0360232 A1* | 11/2021 | Liu | H04N 19/70 |
| 2021/0400294 A1* | 12/2021 | Chen | H04N 19/137 |
| 2022/0264142 A1* | 8/2022 | Hashimoto | H04N 19/70 |

FOREIGN PATENT DOCUMENTS

| | | | |
|---|---|---|---|
| KR | 1020170110556 | 10/2017 | |
| KR | 1020180048736 | 5/2018 | |
| WO | WO-2020094038 A1 * | 5/2020 | ........... H04N 19/105 |
| WO | WO-2020098790 A1 * | 5/2020 | ........... H04N 19/105 |

* cited by examiner

METHOD AND APPARATUS FOR CODING IMAGE BY USING MMVD BASED ON CPR

CROSS-REFERENCE TO RELATED APPLICATIONS

This application is a National Stage application under 35 U.S.C. § 371 of International Application No. PCT/KR2020/000024, filed on Jan. 2, 2020, which claims the benefit of U.S. Provisional Application No. 62/787,753, filed on Jan. 2, 2019. The disclosures of the prior applications are incorporated by reference in their entirety.

BACKGROUND OF DISCLOSURE

Field of the Disclosure

This document relates to image coding technology, and more particularly, to an image coding method and apparatus using current picture referencing (CPR)-based merge with motion vector difference (MMVD).

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY

The purpose of this document is to provide a method and apparatus for improving image coding efficiency.

Another purpose of this document is to provide an efficient inter prediction method and apparatus.

Still another purpose of this document is to provide a method and apparatus for applying merge with motion vector difference (MMVD) in the process of performing current picture referencing (CPR) in order to improve image coding efficiency.

According to an embodiment of this document, an image decoding method performed by a decoding apparatus is provided. The method includes obtaining merge with motion vector difference (MMVD) flag information for a current block from a bitstream, determining whether or not the current block is a current picture referencing (CPR) coding block, deriving base motion information when the current block is a CPR coding block, deriving motion information for the current block based on the base motion information, generating prediction samples for the current block based on the motion information, and generating reconstructed samples for the current block based on the prediction samples, wherein the MMVD flag information is related to whether or not to derive motion information by applying MMVD to the current block, and wherein the CPR coding block is a block coded using a current picture including the current block as a reference picture.

According to another embodiment of the disclosure, an image encoding method performed by an encoding apparatus is provided. The method includes generating merge with motion vector difference (MMVD) flag information by determining whether or not to apply MMVD to a current block, determining whether or not the current block is a current picture referencing (CPR) coding block, deriving base motion information when the current block is a CPR coding block, deriving motion information for the current block based on the base motion information, generating prediction samples for the current block based on the motion information, deriving residual samples based on the prediction samples, and encoding image information including information on the residual samples and the MMVD flag information, wherein the MMVD flag information is related to whether or not to derive motion information by applying MMVD to the current block, and wherein the CPR coding block is a block coded using a current picture including the current block as a reference picture.

According to this document, it is possible to improve overall image/video compression efficiency.

According to this document, it is possible to reduce computational complexity and improve overall coding efficiency through efficient inter prediction.

According to this document, it is possible to maximize performance versus complexity by providing a method for applying simplified MMVD to a CPR-coded block.

DESCRIPTION OF EMBODIMENTS

Figure 1:
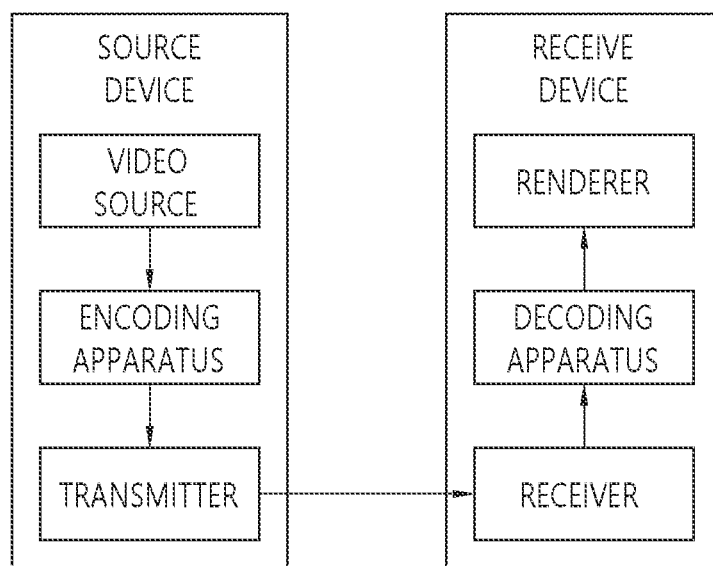
FIG. 1 schematically illustrates an example of a video/image coding system applicable to embodiments of this document.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

Hereinafter, preferred embodiments of this document are described more specifically with reference to the accompanying drawings. Hereinafter, in the drawings, the same reference numeral is used in the same element, and a redundant description of the same element may be omitted.

FIG. 1 schematically illustrates an example of a video/image coding system to which embodiments of this document may be applied.

Referring to FIG. 1, a video/image coding system may include a first device (a source device) and a second device (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
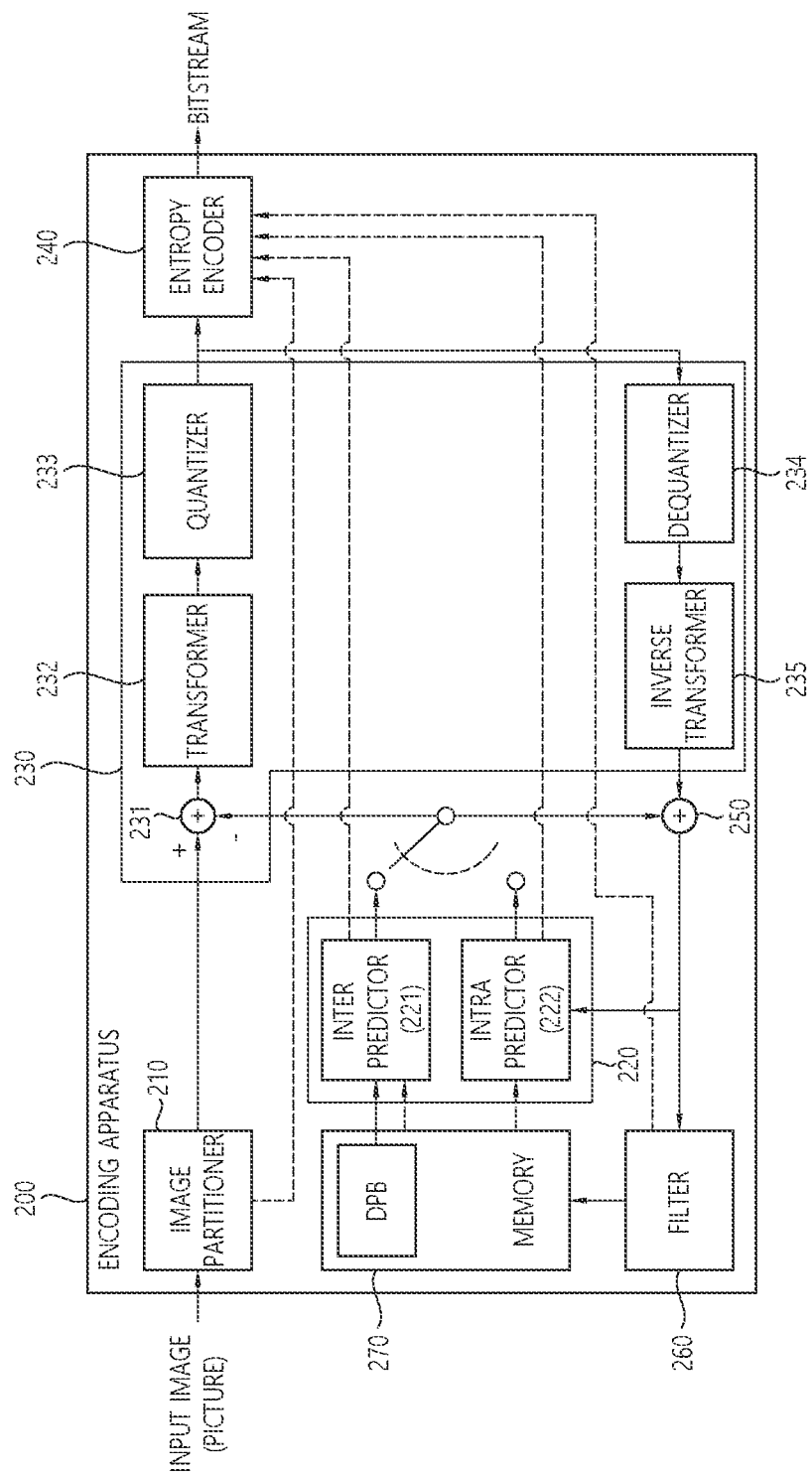
FIG. 2 is a diagram schematically illustrating a configuration of a video/image encoding apparatus applicable to embodiments of this document.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block.

The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
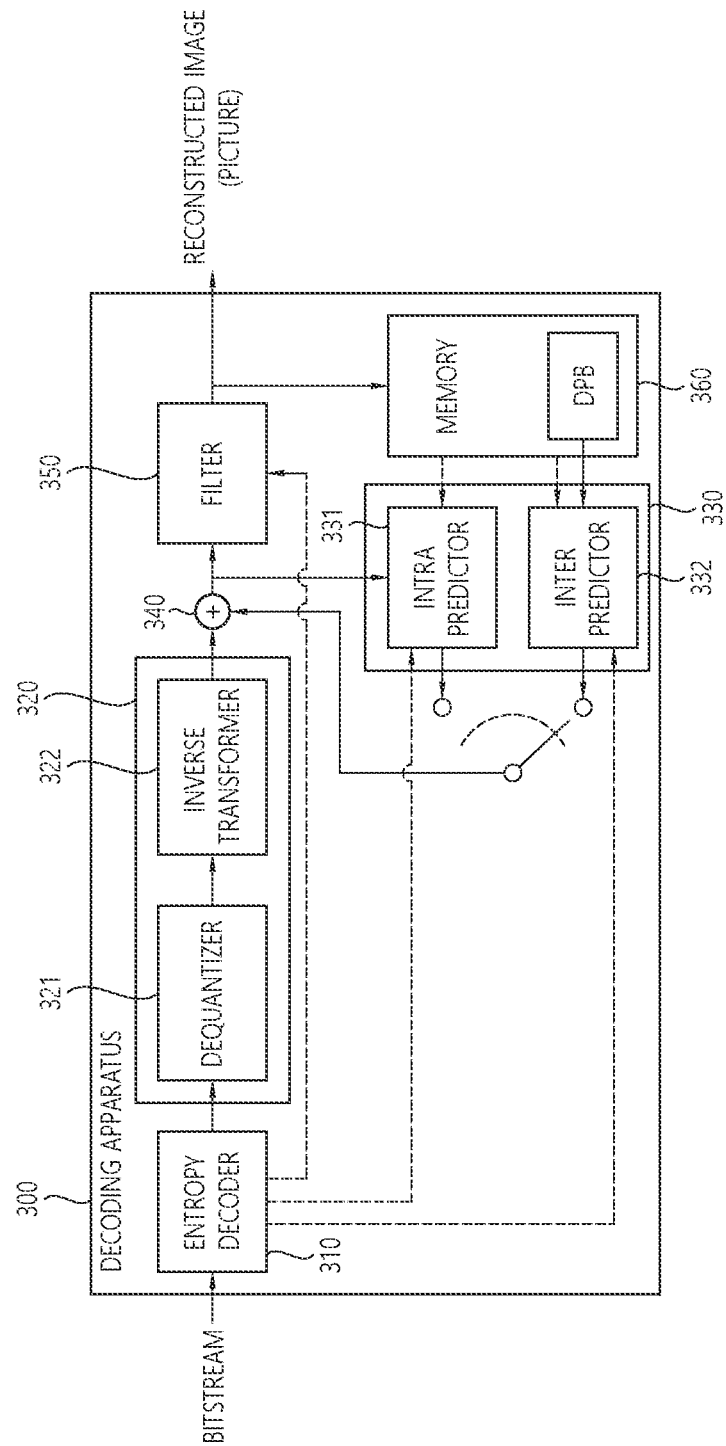
FIG. 3 is a diagram schematically illustrating a configuration of a video/image decoding apparatus applicable to embodiments of this document.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Meanwhile, as described above, the inter prediction may be applied when performing the prediction on the current block. That is, the predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and./or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

Further, various inter prediction modes may be used for the prediction of the current block in the picture. For example, various modes, such as a merge mode, a skip mode, a motion vector prediction (MVP) mode, an affine mode, a subblock merge mode, a merge with MVD (MMVD) mode, and a historical motion vector prediction (HMVP) mode may be used. A decoder side motion vector refinement (DMVR) mode, an adaptive motion vector resolution (AMVR) mode, a bi-prediction with CU-level weight (BCW), a bi-directional optical flow (BDOF), and the like may be further used as additional modes. The affine mode may also be referred to as an affine motion prediction mode. The MVP mode may also be referred to as an advanced motion vector prediction (AMVP) mode. In the present document, some modes and/or motion information candidates derived by some modes may also be included in one of motion information-related candidates in other modes. For example, the HMVP candidate may be added to the merge candidate of the merge/skip modes, or also be added to an mvp candidate of the MVP mode. If the HMVP candidate is used as the motion information candidate of the merge mode or the skip mode, the HMVP candidate may be referred to as the HMVP merge candidate.

The prediction mode information indicating the inter prediction mode of the current block may be signaled from the encoding apparatus to the decoding apparatus. In this case, the prediction mode information may be included in the bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

Further, as described above, inter prediction may be performed using motion information of the current block. The encoding device may derive optimal motion information for the current block through a motion estimation procedure. For example, the encoding device may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding device according to various methods based on the inter prediction mode.

For example, when the motion vector prediction (MVP) mode is applied, a motion vector predictor (MVP) candidate list may be generated using the motion vector of the reconstructed spatial neighboring block and/or the motion vector corresponding to the temporal neighboring block (or Col block). That is, the motion vector of a reconstructed spatial neighboring block and/or the motion vector corresponding to the temporal neighboring block may be used as a motion vector predictor candidate. Information on prediction may include selection information (e.g., an MVP flag or an MVP index) related to an optimal motion vector predictor candidate selected from among the motion vector predictor candidates included in the list. In this case, the predictor may select a motion vector predictor of the current block from among the motion vector predictor candidates included in the motion vector candidate list by using the selection information. The predictor of the encoding apparatus may obtain a motion vector difference (MVD) between the motion vector of the current block and the motion vector predictor, and may output the MVD in the form of a bitstream by encoding the MVD. That is, the MVD may be obtained by subtracting the motion vector predictor from the motion vector of the current block. In this case, the predictor of the decoding apparatus may obtain the motion vector difference included in the information on prediction, and derive the motion vector of the current block by adding the motion vector difference and the motion vector predictor. The predictor of the decoding apparatus may obtain or derive a reference picture index or the like related to a reference picture from the information on prediction.

A predicted block for the current block may be derived based on the motion information derived according to the inter prediction mode. The predicted block may include prediction samples (prediction sample array) of the current block. When the motion vector (MV) of the current block indicates a fractional sample unit, an interpolation procedure may be performed and the prediction samples of the current block may be derived based on reference samples of the fractional sample unit in the reference picture through the interpolation procedure. When the affine inter prediction is applied to the current block, the prediction samples may be generated based on a sample/subblock-unit MV. When the bi-prediction is applied, prediction samples derived through a weighted sum or a weighted average of prediction samples derived based on the L0 prediction (i.e., a prediction using a reference picture in the reference picture list L0 and MVL0) and prediction samples (according to a phase) derived based on the L1 prediction (i.e., a prediction using a reference picture in the reference picture list L1 and MVL1) may be used as the prediction samples of the current block. When the bi-prediction is applied, if the reference picture used for the L0 prediction and the reference picture used for the L1 prediction are located in different temporal directions based on the current picture (i.e., if the prediction corresponds to the bi-prediction and the bi-directional prediction), this may be referred to as a true bi-prediction.

Reconstruction samples and reconstruction pictures may be generated based on the derived prediction samples and thereafter, the procedure such as in-loop filtering, etc., may be performed as described above.

Meanwhile, the prediction for the current block may be performed based on an intra block copy (IBC) prediction mode. The IBC prediction mode may be used for a content image/video coding of a game or the like, such as a screen content coding (SCC). The IBC basically performs the prediction in the current picture but may be performed similarly to the inter prediction in that the reference block is derived in the current picture. In other words, the IBC may use at least one of the inter prediction techniques described in the present document.

For example, the IBC may use at least one of the aforementioned methods for deriving the motion information (motion vector). At least one of the inter prediction techniques may be also partially modified and used in consideration of the IBC prediction as described later. The IBC may refer to the current picture, and thus also be referred to as a current picture referencing (CPR). For example, whether the IBC is applied to the current block may be indicated based on an IBC flag (e.g., pred_mode_ibc_flag). The IBC flag (e.g., pred_mode_ibc_flag) may be coded as a syntax element and generated in the form of a bitstream, and signaled from the encoding apparatus to the decoding apparatus through the bitstream.

For the IBC prediction, the encoding apparatus may derive an optimal block vector (or motion vector) for the current block (e.g., CU) by performing a block matching (BM). The derived block vector (or motion vector) may be signaled to the decoding apparatus through the bitstream using a method similar to the aforementioned signaling of the motion information (motion vector) in the inter prediction. The decoding apparatus may derive the reference block for the current block in the current picture through the signaled block vector (motion vector), thereby deriving a prediction signal (predicted block or predicted samples) for the current block. Here, the block vector may correspond to the aforementioned motion vector, and represent displacement from the current block to the reference block positioned in an already reconstructed area in the current picture. Therefore, the block vector (or motion vector) may also be referred to as a displacement vector. The motion vector in the IBC may correspond to the block vector or the displacement vector. Further, the MVD in the IBC may be referred to as a block vector difference (BVD). The motion vector of the current block may include a motion vector for a luma component (luma motion vector) or a motion vector for a chroma component (chroma motion vector). For example, the luma motion vector for the IBC-coded CU may be an integer sample unit (i.e., integer precision). The chroma motion vector may also be clipped in the integer sample unit. As described above, the IBC may use at least one of the inter prediction techniques, and for example, if the IBC is applied like the AMVR, a 1-pel or 4-pel motion vector precision may be switched.

At the CU level, the IBC prediction mode may be signaled through the flag, and signaled to the IBC (A)MVP mode or the IBC skip/merge mode.

For example, in the IBC skip/merge mode, the block vector of the current block may be derived using a merge candidate index. Here, the merge candidate index may indicate which block vector among the block vectors in the list constructed based on the IBC mode-coded neighboring candidate blocks is used to predict the current block. The merge candidate list may be configured to include the spatial candidate, the historical motion vector prediction (HMVP) candidate, and a pairwise candidate.

In the IBC (A)MVP mode, the block vector difference (BVD) may be coded in the same manner as that in the MVD. The block vector prediction method may use two candidates as a predictor, and the two candidates may be derived from a (IBC mode-coded) left neighboring block and a (IBC mode-coded) top neighboring block. At this time, if the left neighboring block or the top neighboring block is not available, the default block vector may be used as the predictor. The flag may be signaled as index information for indicating the block vector predictor.

Figure 4:
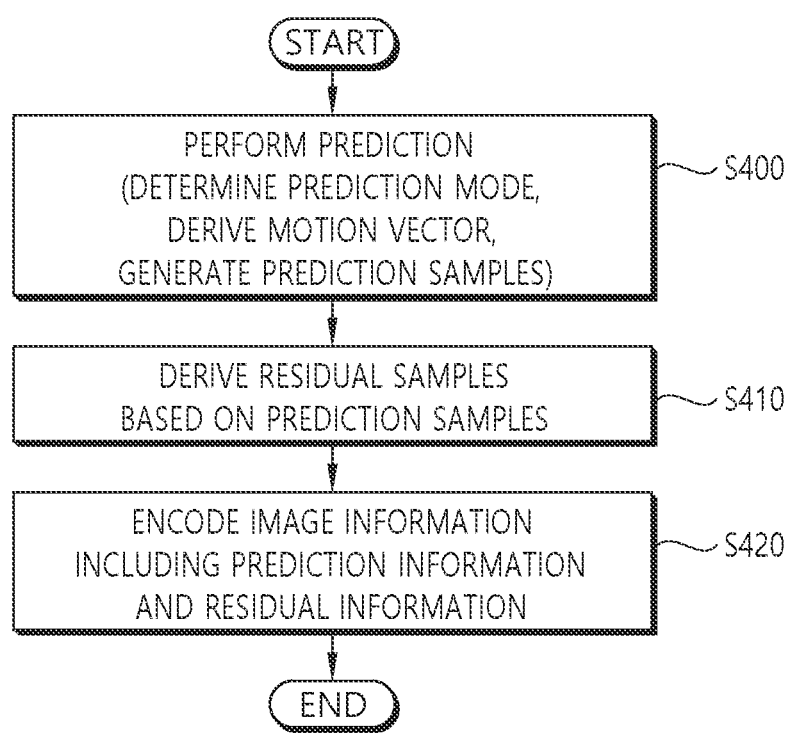
FIG. 4 shows an example of a video/image encoding method based on IBC.
Figure 5:
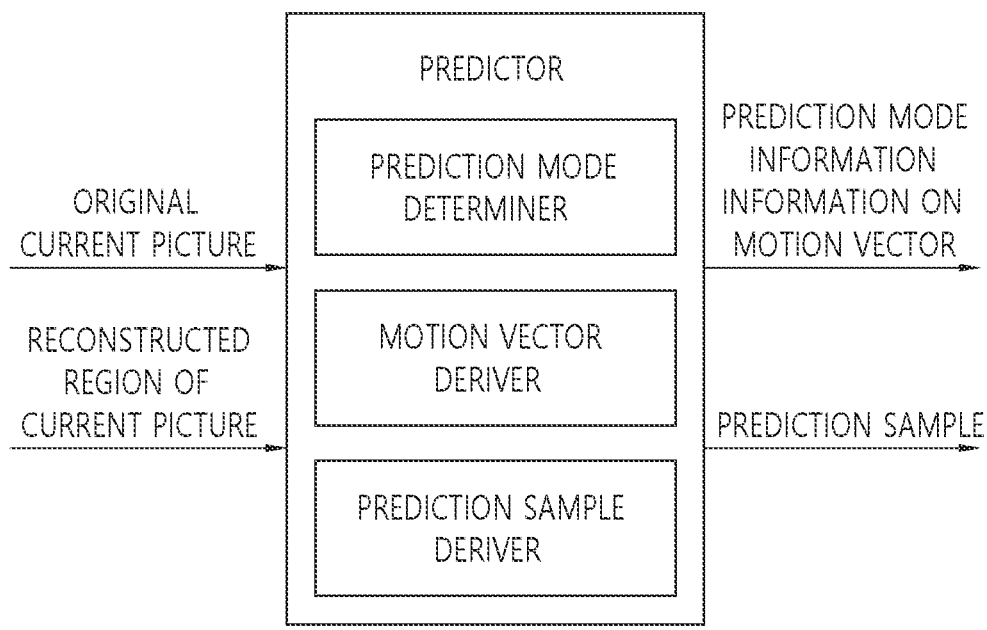
FIG. 5 is an example schematically showing a predictor in an encoding apparatus.

FIG. 4 shows an example of a video/image encoding method based on IBC, and FIG. 5 is an example schematically showing a predictor in an encoding apparatus. The predictor in the encoding apparatus of FIG. 5 may also be similarly or correspondingly applied to the predictor 220 of the encoding apparatus 200 of FIG. 2 described above.

Referring to FIGS. 4 and 5, the encoding apparatus performs IBC prediction (IBC-based prediction) on the current block (S400). The encoding apparatus may derive a motion vector and a prediction mode of the current block, and generate prediction samples of the current block. The prediction mode may include at least one of the above-described inter prediction modes. Here, the prediction mode determination, motion vector derivation, and prediction sample generation processes may be performed at the same time, or one process may be performed before another process.

For example, the predictor of the encoding apparatus may include a prediction mode determiner, a motion vector deriver, and a prediction sample deriver, wherein the prediction mode determiner may determine a prediction mode for the current block, the motion vector deriver may derive motion vector of the current block, and the prediction sample deriver may derive prediction samples of the current block. As described above, the motion vector may be referred to as a block vector. For example, the predictor of the encoding apparatus may search for a block similar to the current block in a reconstructed region of the current picture (or a certain region (search area) of the reconstructed region) through block matching (BM), and derive a reference block whose difference from the current block is less than or equal to a minimum or certain criterion. The motion vector may be derived based on the displacement difference between the reference block and the current block. The encoding apparatus may determine a mode applied to the current block from among various prediction modes. The encoding apparatus may compare RD costs based on the various prediction modes, and determine the optimal prediction mode for the current block.

For example, when the skip mode or the merge mode is applied to the current block, the encoding apparatus may construct the above-described merge candidate list, and derive a reference block whose difference from the current block is minimum, or less than or equal to a certain level from among reference blocks related to merge candidates included in the merge candidate list. In this case, the merge candidate associated with the derived reference block may be selected, and merge index information related to the selected merge candidate may be generated and be signaled to the decoding apparatus. The motion vector of the current block may be derived using the motion vector of the selected merge candidate.

As another example, when the (A)MVP mode is applied to the current block, the encoding apparatus may construct the above-described (A)MVP candidate list, and use, as an mvp (motion vector predictor) of the current block, the motion vector of an mvp candidate selected from among mvp candidates included in the (A)MVP candidate list. In this case, for example, the motion vector related to the reference block derived by the above-described motion estimation may be used as the motion vector of the current block, and the one of the mvp candidates which has a motion vector whose difference from the motion vector of the current block is smallest may be the selected mvp candidate. MVD (motion vector difference), which is a difference obtained by subtracting the mvp from the motion vector of the current block, may be derived. In this case, the information on the MVD may be signaled to the decoding apparatus.

The encoding apparatus may derive residual samples based on the prediction samples (S410). The encoding apparatus may derive the residual samples via comparison of original samples of the current block and the prediction samples.

The encoding apparatus encodes image information including prediction information and residual information (S420). The encoding apparatus may output the encoded image information in the form of a bitstream. The prediction information may include prediction mode information (e.g., skip flag, merge flag, mode index or the like) and information on motion vector as informations on the prediction process. The information on motion vector may include candidate selection information (e.g., merge index, mvp flag, or mvp index), which is information for deriving a motion vector. Also, the information on the motion vector may include information on the above-described MVD. Further, the information on motion vector may include information related to whether the L0 prediction, the L1 prediction, or bi-prediction is applied. The residual information is information on the residual samples. The residual information may include information on quantized transform coefficients for the residual samples.

The output bitstream may be stored in a (digital) storage medium and transferred to the decoding apparatus, or may be transferred to the decoding apparatus through a network.

Meanwhile, as described above, the encoding apparatus may generate a reconstructed picture (including reconstructed samples and a reconstructed block) based on the reference samples (that is, prediction samples) and the residual samples. This is to derive the same prediction result in the encoding apparatus as one that is performed in the decoding apparatus, and the reason is that coding efficiency can be increased through this. Therefore, the encoding apparatus may store a reconstructed picture (or reconstructed samples, a reconstructed block) in the memory, and utilize it as a reference picture for inter prediction. The in-loop filtering process and the like may be further applied to the reconstructed picture as described above.

Figure 6:
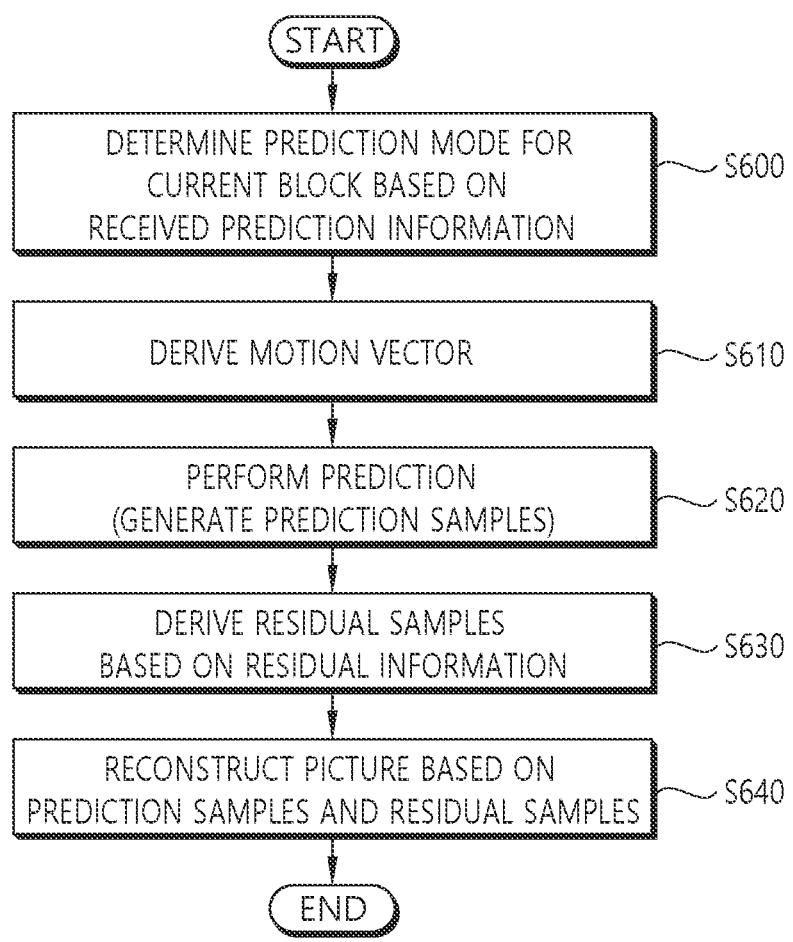
FIG. 6 shows an example of a video/image decoding method based on IBC.
Figure 7:
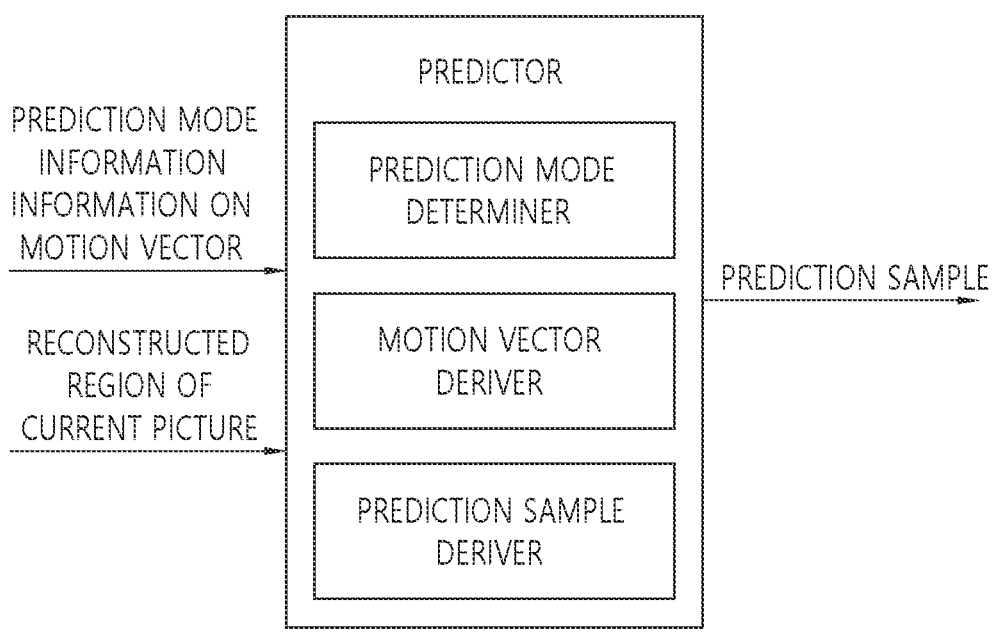
FIG. 7 is an example schematically showing a predictor in a decoding apparatus.

FIG. 6 shows an example of a video/image decoding method based on IBC, and FIG. 7 is an example schematically showing a predictor in a decoding apparatus. The predictor in the encoding apparatus of FIG. 7 may also be similarly or correspondingly applied to the predictor 330 of the decoding apparatus 300 of FIG. 3 described above.

Referring to FIGS. 6 and 7, the decoding apparatus may perform an operation corresponding to the operation which has been performed in the above-described encoding apparatus. The decoding apparatus may perform IBC prediction on the current block and derive the prediction samples, based on the received prediction information.

Specifically, the decoding apparatus may determine the prediction mode for the current block based on the received prediction information (S600). The decoding apparatus may determine which inter prediction mode is applied to the current block based on the prediction mode information in the prediction information.

For example, it may be determined whether the merge mode is applied to the current block or (A)MVP mode is determined based on the merge flag. Alternatively, one inter prediction mode may be selected from among various inter prediction mode candidates based on the morge index. The inter prediction mode candidates may include the skip mode, the merge mode and/or the (A)MVP mode, or may include various inter prediction modes.

The decoding apparatus derives the motion vector of the current block based on the determined prediction mode (S610). As described above, the motion vector may be referred to as a block vector.

For example, when the skip mode or the merge mode is applied to the current block, the decoding apparatus may construct the above-described merge candidate list, and select one of merge candidates included in the merge candidate list. The selection may be performed based on the above-described selection information (merge index). The motion vector of the current block may be derived using the motion vector of the selected merge candidate. The motion vector of the selected merge candidate may be used as the motion vector of the current block.

As another example, when the (A)MVP mode is applied to the current block, the decoding apparatus may construct the above-described (A)MVP candidate list, and use, as an mvp (motion vector predictor) of the current block, the motion vector of an mvp candidate selected from among mvp candidates included in the (A)MVP candidate list. The selection may be performed based on the above-described selection information (mvp flag or mvp index). In this case, MVD of the current block may be derived based on information on the MVD, and the motion vector of the current block may be derived based on the MVD and the mvp of the current block. Further, the reference picture of the current block may be derived based on the reference picture index information. The picture in the reference picture list concerning the current block, which the reference picture index indicates may be derived as a reference picture which is referred to for the inter prediction of the current block.

Meanwhile, the motion information of the current block may be derived without constructing the candidate list as described above, and in this case, the motion vector of the current block may be derived according to the process disclosed in the corresponding prediction mode. In this case, the constructing of the candidate list as described above may be omitted.

The decoding apparatus may generate prediction samples for the current block based on the motion vector of the current block (S620). In this case, prediction samples of the current block may be derived using samples of the reference block indicated by the motion vector of the current block on the current picture. In this case, a prediction sample filtering process for the all or some of prediction samples of the current block may be further performed.

For example, the predictor of the decoding apparatus may include a prediction mode determiner, a motion vector deriver, and a prediction sample deriver, may determine a prediction mode for the current block based on prediction mode information received at the prediction mode determiner, may derive motion vector of the current block based on information on motion vector received at the motion vector deriver, and may derive prediction samples of the current block at the prediction sample deriver.

The decoding apparatus generates the residual samples for the current block based on the received residual information (S630). The decoding apparatus may generate the reconstructed samples for the current block based on the residual samples and the prediction samples, and generate the reconstructed picture based on these reconstructed samples (S640). After this, the in-loop filtering process and the like may be further applied to the reconstructed picture as described above.

Meanwhile, as described above, IBC prediction may use at least one of inter prediction techniques. For example, IBC prediction may signal whether IBC is enabled through a sequence parameter set (SPS) syntax. In this regard, when it is signaled that IBC is enabled through the SPS syntax, the I slice may be processed like the P slice, and inter prediction coding (e.g., merge mode, (A)MVP mode) may be applied. Here, the I slice (intra slice) may mean a slice coded using only intra prediction. The P slice (predictive slice) may mean a slice coded using intra prediction or inter prediction, and in particular, may mean a slice coded based on inter prediction using one motion vector and a reference picture index.

However, in the current IBC prediction, even if the IBC does not operate simultaneously with the inter prediction coding, the current IBC mode is signaled not to allow the inter prediction coding. For example, syntaxes related to inter prediction such as merge with MVD (MMVD) mode, affine mode, multi-hypothesis mode, and tri-angular mode are signaled, including information indicating that the inter prediction coding does not work.

However, in order to maximize performance versus complexity, the MMVD among the inter prediction techniques may be applied in the process of performing the IBC prediction. Accordingly, this document proposes a method capable of applying the MMVD to the IBC prediction. In particular, it proposes a method capable of applying the MMVD in the case of current picture referencing (CPR), in other words, in a case where the current picture is referred to in the process of coding the current block, and there is only one reference picture in the reference picture list, which is the current picture.

Meanwhile, the MMVD mode is a method of applying motion vector difference (MVD) to the merge mode, and the motion information directly used to generate prediction samples of the current block (i.e., the current CU) may be implicitly derived. For example, an MMVD flag (e.g., mmvd_flag) related to whether or not to use MMVD for a current block (i.e., a current CU) may be signaled, and the MMVD may be performed based on this MMVD flag. When the MMVD is applied to the current block (e.g., when mmvd_flag is 1), additional information on the MMVD may be signaled.

Here, the additional information on the MMVD may include a merge candidate flag (e.g., mmvd_cand_flag) related to indicating whether or not the first candidate or the second candidate in the merge candidate list is used together with the MVD, a distance index for indicating the motion magnitude (e.g., mmvd_distance_idx), and a direction index (e.g., mmvd_direction_idx) for indicating a motion direction.

In the MMVD mode, two candidates (i.e., the first candidate or the second candidate) located in the first and second entries among the candidates in the merge candidate list may be used, and one of the two candidates (i.e., the first candidate or the second candidate) may be used as a base MV. For example, a merge candidate flag (e.g., mmvd_cand_flag) may be signaled to indicate any one of two candidates (i.e., the first candidate or the second candidate) in the merge candidate list.

In addition, the distance index (e.g., mmvd_distance_idx) may be related to motion magnitude information, and may be related to a predetermined offset from the starting point. The offset may be added to a horizontal component or a vertical component of a starting motion vector. The relationship between the distance index and the predetermined offset may be shown as in Table 1 below.

TABLE 1

| | MmvdDistance[ x0 ][ y0 ] | |
|---|---|---|
| mmvd_distance_idx[ x0 ][ y0 ] | slice_fpel_mmvd_enabled_flag == 0 | slice_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

Referring to Table 1 above, the distance of the MVD (e.g., MmvdDistance) is determined according to the value of the distance index (e.g., mmvd_distance_idx), and the distance (e.g., MmvdDistance) of the MVD may be derived using integer sample precision or fractional sample precision based on the value of slice_fpel_mmvd_enabled_flag. For example, when slice_fpel_mmvd_enabled_flag is 1, it may indicate that the distance of MVD is derived using integer sample precision in the current slice, and when slice_fpel_mmvd_enabled_flag is 0, it may indicate that the distance of the MVD is derived using fractional sample precision in the current slice.

In addition, the direction index (e.g., mmvd_direction_idx) may indicate the direction of the MVD based on the starting point, and may indicate four directions as shown in Table 2 below. In this case, the direction of the MVD may indicate the sign of the MVD. The relationship between the direction index and the MVD code may be shown as in Table 2 below.

TABLE 2

| mmvd_direction_idxs[ x0 ][ y0 ] | MmvdSign[ x0 ][ y0 ][0] | MmvdSign[ x0 ][ y0 ][1] |
|---|---|---|
| 0 | +1 | 0 |
| 1 | −1 | 0 |
| 2 | 0 | +1 |
| 3 | 0 | −1 |

Referring to Table 2, the sign of the MVD (e.g., Mmvd-Sign) may be determined according to the value of the direction index (e.g., mmvd_direction_idx), and the sign of As an embodiment, the method of applying the MMVD to the CPR-coded block may be performed based on the syntax shown in Table 3 below.

TABLE 3

|  | Descriptor |
|---|---|
| merge_data( x0, y0, cbWidth, cbHeight ) { | |
|    mmvd_flag[ x0 ][ y0 ] | ae(v) |
|    if(mmvd_flag[ x0 ][ y0 ] = = 1 ) { | |
|      if (!CurrPicIsOnlyRef) | |
|        mmvd_merge_flag[ x0 ][ y0 ] | ae(v) |
|        mmvd_distance_idx[ x0 ][ y0 ] | ae(v) |
|        mmvd_direction_idx[ x0 ][ y0 ] | ae(v) |
|    } else { | |
|      if(MaxNumSubblockMergeCand > 0 && cbWidth >= 8 && cbHeight >= 8 ) | |
|        merge_subblock_flag[ x0 ][ y0 ] | ae(v) |
|      if( merge_subblock_flag[ x0 ][ y0 ] = = 1 ) { | |
|        if( MaxNumSubblockMergeCand > 1 ) | |
|          merge_subblock_idx[ x0 ][ y0 ] | ae(v) |
|      } else { | |
|        if(sps_mh_intra_enabled_flag && cu_skip_flag[ x0 ][ y0 ] = = 0 && | |
|          ( cbWidth * cbHeight) >= 64 && cbWidth < 128 && cbHeight < 128 ) { | |
|          mh_intra_flag[ x0 ][ y0 ] | ae(v) |
|        if( mh_intra_flag[ x0 ][ y0 ] ) { | |
|          if ( cbWidth <= 2 * cbHeight || cbHeight <= 2 * cbWidth ) | |
|            mh_intra_luma_mpm_flag[ x0 ][ y0 ] | ae(v) |
|          if( mh_intra_luma_mpm_flag[ x0 ][ y0 ] ) | |
|            mh_intra_luma_mpm_idx[ x0 ][ y0 ] | ae(v) |
|        } | |
|        } | |
|        if(sps_triangle_enabled_flag && slice_type = = B && cbWidth * cbHeight >= 16 ) | |
|          merge_triangle_flag[ x0 ][ y0 ] | ae(v) |
|        if( merge_triangle_flag[ x0 ][ y0 ] ) | |
|          merge_triangle_idx[ x0 ][ y0 ] | ae(v) |
|        else if( MaxNumMergeCand > 1 ) | |
|          merge_idx[ x0 ][ y0 ] | ae(v) |
|      } | |
|    } | |
| } | | the MVD (e.g., MmvdSign) may be derived for the L0 reference picture and the L1 reference picture.

The offset of the MVD may be calculated as in Equation 1 below based on the above-described distance index (e.g., mmvd_distance_idx) and direction index (e.g., mmvd_direction_idx).

$$MmvdOffset[x0][y0][0]=(MmvdDistance[x0][y0]<<2)$$
$$*MmvdSign[x0][y0][0]MmvdOffset[x0][y0][1]=$$
$$(MmvdDistance[x0][y0]<<2)*MmvdSign[x0]$$
$$[y0][1] \quad \text{[Equation 1]}$$

That is, in the MMVD mode, a merge candidate indicated by the merge candidate flag (e.g., mmvd_cand_flag) may be selected from among the merge candidates in the merge candidate list derived based on the neighboring block, and the selected merge candidate may be used as a base candidate (e.g., MVP). In addition, the motion information (i.e., motion vector) of the current block may be derived by adding the MVD derived using the distance index (e.g., mmvd_distance_idx) and a direction index (e.g., mmvd_direction_idx) based on the base candidate.

Hereinafter, a method capable of applying MMVD among inter prediction techniques in the process of performing IBC prediction will be described. In particular, it proposes a method of applying the MMVD in the case of the CPR, in other words, in a case where the current picture is referred to in the process of coding the current block, and there is only one reference picture in the reference picture list, which is the current picture.

Referring to Table 3, the MMVD flag (e.g., mmvd_flag) related to indicating whether or not motion information is derived using the MMVD for the current block may be signaled through a syntax (e.g., merge_data). In this regard, when the value of the MMVD flag (e.g., mmvd_flag) is 1, it may mean that motion information is derived using the MMVD for the current block. In this case (that is, when the value of the MMVD flag (e.g., mmvd_flag) is 1), it is possible to determine whether or not it is a CPR that performs prediction by deriving a reference block for the current block in the current picture (e.g., CurrPicIsOnlyRef). For example, whether the value of CurrPicIsOnlyRef is 1 or 0 (or true or false) may be derived based on a syntax element (e.g., pred_mode_ibc_flag) related to indicating whether or not the IBC prediction is applied to the current block as described above.

For example, when prediction is performed on the current block based on CPR (i.e., when the current block is a CPR coding block), a merge candidate flag (e.g., mmvd_merge_flag) may not be signaled. That is, even though the merge candidate flag (e.g., mmvd_merge_flag) is not signaled, when the current block is the CPR coding block, a predetermined base candidate (i.e., a default candidate) may be used. For example, the base candidate may be inferred as a first candidate (i.e., a candidate whose merge candidate index value is 0) located in the first entry among the merge candidates in the merge candidate list.

Alternatively, when prediction is not performed based on the CPR for the current block (that is, when the current block is not a CPR coding block), the merge candidate flag (e.g., mmvd_merge_flag) may be signaled through a syntax (e.g., merge_data). In this case, as described above, a candidate indicated by a merge candidate flag (e.g., mmvd_merge_flag) among candidates in the merge candidate list may be selected and used as the base candidate.

As described above, the base candidate may be derived based on whether or not the current block is a CPR coding block, and the motion information of the current block may be derived based on the motion vector of the base candidate. That is, the distance index (e.g., mmvd_distance_idx) and a direction index (e.g., mmvd_direction_idx) may be additionally signaled through a syntax (e.g., merge_data). As described above, the MVD may be derived based on the distance index (e.g., mmvd_distance_idx) and the direction index (e.g., mmvd_direction_idx), and the motion vector of the current block may be derived by adding the MVD to the motion vector of the base candidate.

According to the syntax structure of Table 3, a parsing process of the merge candidate flag (e.g., mmvd_merge_flag) may be omitted based on whether or not the current block is the CPR coding block. That is, when the current block is a CPR coding block, coding efficiency may be increased by simplifying additional syntax information even when the MMVD is applied.

Figure 8:
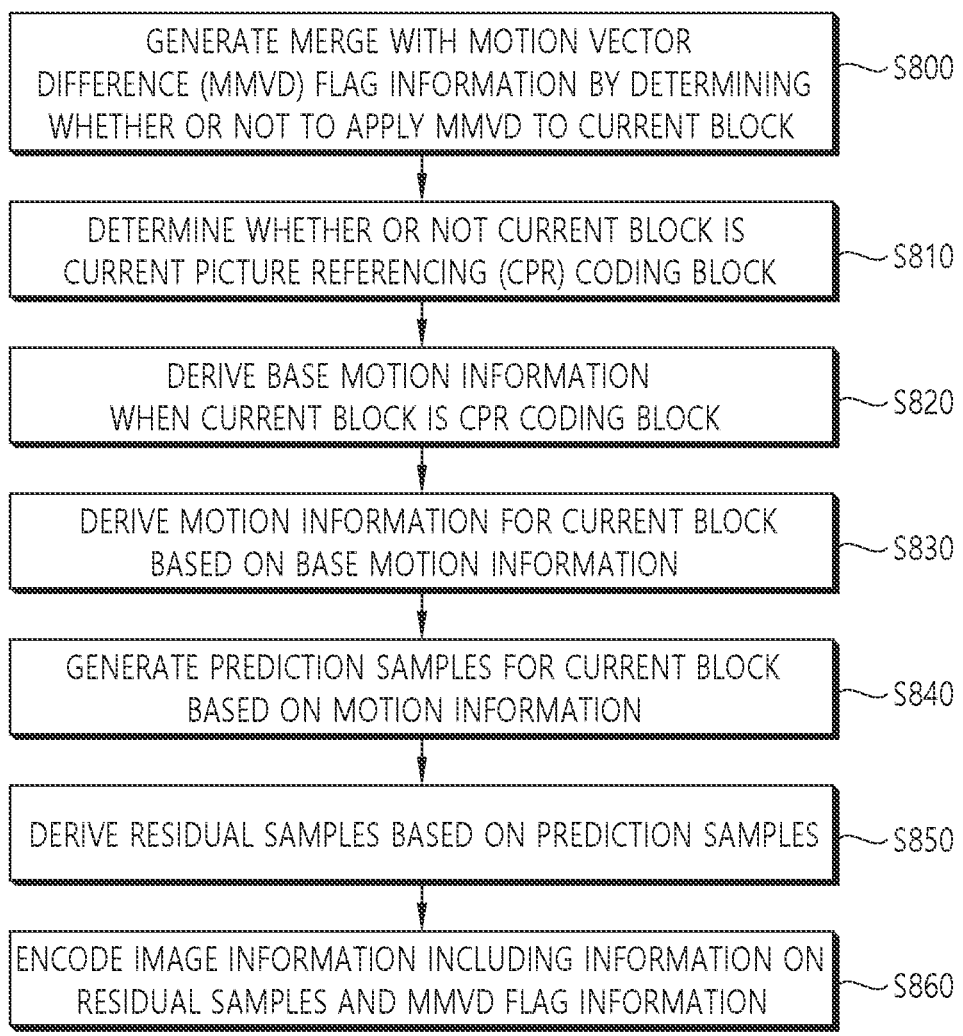
FIG. 8 is a flowchart schematically illustrating an encoding method which may be performed by an encoding apparatus according to an embodiment of this document.

FIG. 8 is a flowchart schematically illustrating an encoding method which may be performed by an encoding apparatus according to an embodiment of this document.

The method disclosed in FIG. 8 may be performed by the encoding apparatus 200 disclosed in FIG. 2. Specifically, steps S800 to S840 of FIG. 8 may be performed by the predictor 220 and the inter predictor 221 disclosed in FIG. 2, and step S850 of FIG. 8 may be performed by the residual processor 230 disclosed in FIG. 2, and step S860 of FIG. 8 may be performed by the entropy encoder 240 disclosed in FIG. 2. In addition, the method disclosed in FIG. 8 may include the embodiments described above in this document. Accordingly, in FIG. 8, a detailed description of contents corresponding to the repetition of the above-described embodiments will be omitted or simplified.

Referring to FIG. 8, the encoding apparatus may generate merge with motion vector difference (MMVD) flag information by determining whether or not to apply MMVD to a current block (S800).

As an embodiment, the encoding apparatus may compare RD costs based on the various prediction modes, and determine the optimal prediction mode for the current block. At this time, the encoding apparatus may determine whether or not to apply the MMVD to the current block as the optimal prediction mode based on the RD cost, and may generate the MMVD flag information related to indicating whether or not the motion information is derived by applying the MMVD to the current block according to the determination. Additionally, the encoding apparatus may encode the MMVD flag information and signal it to the decoding apparatus.

For example, the MMVD flag information may be the above-described mmvd_flag. When the value of the MMVD flag information (e.g., mmvd_flag) is 1, it may represent that the motion information is derived by applying the MMVD to the current block, and when the value of the MMVD flag information (e.g., mmvd flag) is 0, it may represent that the MMVD is not applied to the current block. That is, when it is determined that the MMVD is applied to the current block, the encoding apparatus may set the value of the MMVD flag information to 1 and encode it. Alternatively, when it is determined that the MMVD is not applied to the current block, the encoding apparatus may set the value of the MMVD flag information to 0 and encode it.

The encoding apparatus may determine whether or not the current block is a current picture referencing (CPR) coding block (S810).

In this case, the CPR coding block may refer to a block coded using the current picture including the current block as a reference picture.

As an embodiment, the encoding apparatus may construct a reference picture list for the current block. In this case, when the reference picture list includes only one reference picture and the one reference picture is the current picture, the encoding apparatus may determine that the current block is the CPR coding block.

When the current block is the CPR coding block, the encoding apparatus may derive base motion information of the current block (S820).

As an embodiment, when the MMVD is applied to the current block and the current block is the CPR coding block, the encoding apparatus may not explicitly signal the MMVD candidate flag information related to indicating one of motion information candidates for the current block. In this case, one motion candidate of the motion information candidates for the current block may be derived as the base motion information. For example, the base motion information may use a firstly-ordered candidate among motion information candidates in the merge candidate list for the current block. That is, the firstly-ordered candidate may be a candidate whose index value for indicating candidates in the merge candidate list is 0.

Meanwhile, when the MMVD is applied to the current block and the current block is not the CPR coding block, the encoding apparatus may generate the MMVD candidate flag information related to indicating one of motion information candidates for the current block. In this case, the base motion information may be derived based on the MMVD candidate flag information. For example, there may be two motion information candidates for the current block, and the two motion information candidates may be a firstly-ordered candidate and a secondly-ordered candidate in the merge candidate list for the current block. That is, the firstly-ordered candidate may be a candidate whose index value for indicating candidates in the merge candidate list is 0, and the secondly-ordered candidate may be a candidate whose index value for indicating candidates in the merge candidate list is 1. In this case, the MMVD candidate flag information may indicate one of the two motion information candidates, for example, one of the firstly-ordered candidate and the secondly-ordered candidate.

For example, the MMVD candidate flag information may be the above-described mmvd_merge_flag. When the value of the MMVD candidate flag information (e.g., mmvd_merge_flag) is 0, the firstly-ordered candidate in the merge candidate list may be indicated, and when the value of the MMVD candidate flag information (e.g., mmvd_merge_flag) is 1, the secondly-ordered candidate in the merge candidate list may be indicated. That is, the encoding apparatus may perform encoding based on the value of the MMVD candidate flag information (e.g., mmvd_merge_flag) related to indicating the motion information candidate (i.e., base motion information) for the current block, and may signal the value to the decoding apparatus.

As described above, the base motion information may be derived based on the motion information candidates in the merge candidate list, and in this regard, the motion information candidates in the merge candidate list may be derived based on spatial neighboring blocks and/or temporal neighboring blocks of the current block. For example, the spatial neighboring blocks may include at least one of a left neighboring block, a top neighboring block, a top-right corner neighboring block, a bottom-left corner neighboring block, and/or a top-left corner neighboring block which are located adjacent to the current block. The temporal neighboring blocks may include a below-right center block of the collocated block of the current block in a collocated picture and/or a bottom-right corner neighboring block of the collocated block. Here, the collocated block may represent a block located at a position in the collocated picture corresponding to the position of the current block.

The encoding apparatus may derive the motion information for the current block based on the base motion information (S830).

As an embodiment, the encoding apparatus may generate a distance index related to indicating a magnitude of a motion vector difference and a direction index related to indicating a motion direction when the MMVD is applied to the current block based on the MMVD flag information. For example, the distance index may be the above-described mmvd_distance_idx, and the direction index may be the above-described mmvd_direction_idx. The encoding apparatus may derive the value of the distance index based on the magnitude (e.g., MmvdDistance) of the MVD shown in Table 1, and may derive the value of the direction index based on the sign (e.g., MmvdSign) of the MVD shown in Table 2 above. In addition, encoding may be performed based on the values of the distance index and the direction index, and the values may be signaled to the decoding apparatus.

And, the encoding apparatus may derive the motion vector difference (MVD) based on the distance index and the direction index. For example, the MVD may be calculated as in Equation 1 above.

The encoding apparatus may derive the motion information of the current block based on the base motion information and the MVD. For example, the motion information (i.e., the motion vector) of the current block may be derived by adding the MVD calculated as in Equation 1 to the base motion information (i.e., the base motion vector).

The encoding apparatus may generate prediction samples for the current block based on the motion information (S840), and may derive residual samples based on the prediction samples (S850).

As an embodiment, the encoding apparatus may generate prediction samples based on the reference block indicated by the motion information (i.e., a motion vector) in a current picture or a reference picture in a reference picture list. In addition, the encoding apparatus may derive the residual samples based on original samples for the current block and prediction samples of the current block, and may generate information about the residual samples. Here, the information on the residual samples may include information such as value information of quantized transform coefficients derived by performing transform and quantization on the residual samples, location information, a transform technique, a transform kernel, a quantization parameter and the like.

The encoding apparatus may encode image information including the MMVD flag information and the information on residual samples (S860).

That is, the encoding apparatus may encode the MMVD flag information and the information on the residual samples, output the encoded information as a bitstream, and transmit it to the decoding apparatus through a network or a storage medium. Also, the encoding apparatus may encode the image information (e.g., the MMVD candidate flag information, the distance index, the direction index, etc.) derived in the above-described process and generate a bitstream.

Figure 9:
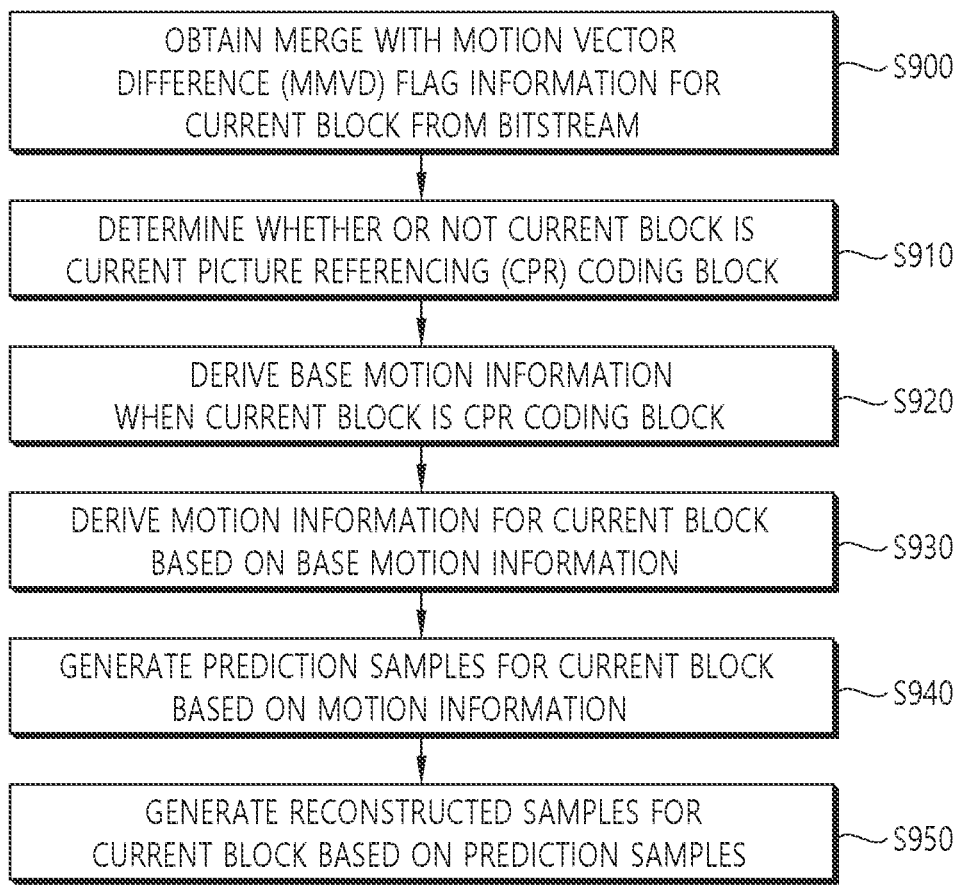
FIG. 9 is a flowchart schematically illustrating a decoding method which may be performed by a decoding apparatus according to an embodiment of this document.

FIG. 9 is a flowchart schematically illustrating a decoding method which may be performed by a decoding apparatus according to an embodiment of this document.

The method disclosed in FIG. 9 may be performed by the decoding apparatus 300 disclosed in FIG. 3. Specifically, step S900 of FIG. 9 may be performed by the entropy decoder 310 disclosed in FIG. 3, and steps S910 to S940 of FIG. 9 may be performed by the predictor 330 and the inter predictor 332 disclosed in FIG. 3, and step S950 of FIG. 9 may be performed by the adder 340 disclosed in FIG. 3. In addition, the method disclosed in FIG. 9 may include the embodiments described above in this document. Accordingly, in FIG. 9, a detailed description of contents corresponding to the repetition of the above-described embodiments will be omitted or simplified.

Referring to FIG. 9, the decoding apparatus may obtain merge with motion vector difference (MMVD) flag information for a current block from a bitstream (S900).

Here, the MMVD flag information may be information related to indicating whether or not the motion information is derived by applying the MMVD to the current block. For example, the MMVD flag information may be the above-described mmvd_flag. When the value of the MMVD flag information (e.g., mmvd_flag) is 1, it may represent that the motion information is derived by applying the MMVD to the current block, and when the value of the MMVD flag information (e.g., mmvd flag) is 0, it may represent that the MMVD is not applied to the current block. That is, the decoding apparatus may determine whether or not to apply the MMVD to the current block by decoding the MMVD flag information.

The decoding apparatus may determine whether or not the current block is a current picture referencing (CPR) coding block (S910).

In this case, the CPR coding block may refer to a block coded using the current picture including the current block as a reference picture.

As an embodiment, the decoding apparatus may construct a reference picture list for the current block. In this case, when the reference picture list includes only one reference picture and the one reference picture is the current picture, the decoding apparatus may determine that the current block is the CPR coding block.

When the current block is the CPR coding block, the decoding apparatus may derive base motion information of the current block (S920).

As an embodiment, when the MMVD is applied to the current block and the current block is the CPR coding block, the MMVD candidate flag information related to indicating one of motion information candidates for the current block may not be explicitly signaled. In this case, the decoding apparatus may derive one motion candidate of the motion information candidates for the current block as the base motion information. For example, the base motion information may use a firstly-ordered candidate among motion information candidates in the merge candidate list for the current block. That is, the firstly-ordered candidate may be a candidate whose index value for indicating candidates in the merge candidate list is 0.

On the other hand, when the MMVD is applied to the current block and the current block is not the CPR coding block, the decoding apparatus may obtain the MMVD candidate flag information related to indicating one of motion information candidates for the current block from the bitstream. In this case, the base motion information may be derived based on the MMVD candidate flag information. For example, there may be two motion information candidates for the current block, and the two motion information candidates may be a firstly-ordered candidate and a secondly-ordered candidate in the merge candidate list for the current block. That is, the firstly-ordered candidate may be a candidate whose index value for indicating candidates in the merge candidate list is 0, and the secondly-ordered candidate may be a candidate whose index value for indicating candidates in the merge candidate list is 1. In this case, the MMVD candidate flag information may indicate one of the two motion information candidates, for example, one of the firstly-ordered candidate and the secondly-ordered candidate.

For example, the MMVD candidate flag information may be the above-described mmvd_merge_flag. When the value of the MMVD candidate flag information (e.g., mmvd_merge_flag) is 0, the firstly-ordered candidate in the merge candidate list may be indicated, and when the value of the MMVD candidate flag information (e.g., mmvd_merge_flag) is 1, the secondly-ordered candidate in the merge candidate list may be indicated. That is, the decoding apparatus may derive the base motion information of the current block based on a value of MMVD candidate flag information (e.g., mmvd_merge_flag) related to indicating a motion information candidate (i.e., base motion information) for the current block.

As described above, the base motion information may be derived based on the motion information candidates in the merge candidate list, and in this regard, the motion information candidates in the merge candidate list may be derived based on spatial neighboring blocks and/or temporal neighboring blocks of the current block. For example, the spatial neighboring blocks may include at least one of a left neighboring block, a top neighboring block, a top-right corner neighboring block, a bottom-left corner neighboring block, and/or a top-left corner neighboring block which are located adjacent to the current block. The temporal neighboring blocks may include a below-right center block of the collocated block of the current block in a collocated picture and/or a bottom-right corner neighboring block of the collocated block. Here, the collocated block may represent a block located at a position in the collocated picture corresponding to the position of the current block.

The decoding apparatus may derive motion information for the current block based on the base motion information (S930).

As an embodiment, the decoding apparatus may obtain a distance index related to indicating a magnitude of a motion vector difference and a direction index related to indicating a motion direction from a bitstream when the MMVD is applied to the current block based on the MMVD flag information. For example, the distance index may be the above-described mmvd_distance_idx, and the direction index may be the above-described mmvd_direction_idx. The decoding apparatus may derive the magnitude (e.g., MmvdDistance) of the MVD based on the value of the distance index (e.g., mmvd_distance_idx) as in Table 1 above, and may derive the sign of the MVD (e.g., MmvdSign) based on the value of the direction index (e.g., mmvd_direction_idx) as in Table 2.

And, the decoding apparatus may derive the motion vector difference (MVD) based on the distance index and the direction index. For example, the MVD may be calculated as in Equation 1 above.

The decoding apparatus may derive the motion information of the current block based on the base motion information and the MVD. For example, the motion information (i.e., the motion vector) of the current block may be derived by adding the MVD calculated as in Equation 1 to the base motion information (i.e., the base motion vector).

The decoding apparatus may generate prediction samples for the current block based on the motion information (S940), and may generate reconstructed samples for the current block based on the prediction samples (S950).

As an embodiment, the decoding apparatus may generate prediction samples based on the reference block indicated by the motion information (i.e., a motion vector) in a current picture or a reference picture in a reference picture list. In addition, the decoding apparatus may receive information on the residual for the current block, and may derive residual samples (or residual sample array) for the current block based on the received information. Here, the information on the residual may include transform coefficients of the residual samples. The decoding apparatus may generate reconstructed samples based on the prediction samples and the residual samples, and may derive a reconstructed block or a reconstructed picture based on the reconstructed samples.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (ex. information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 10:
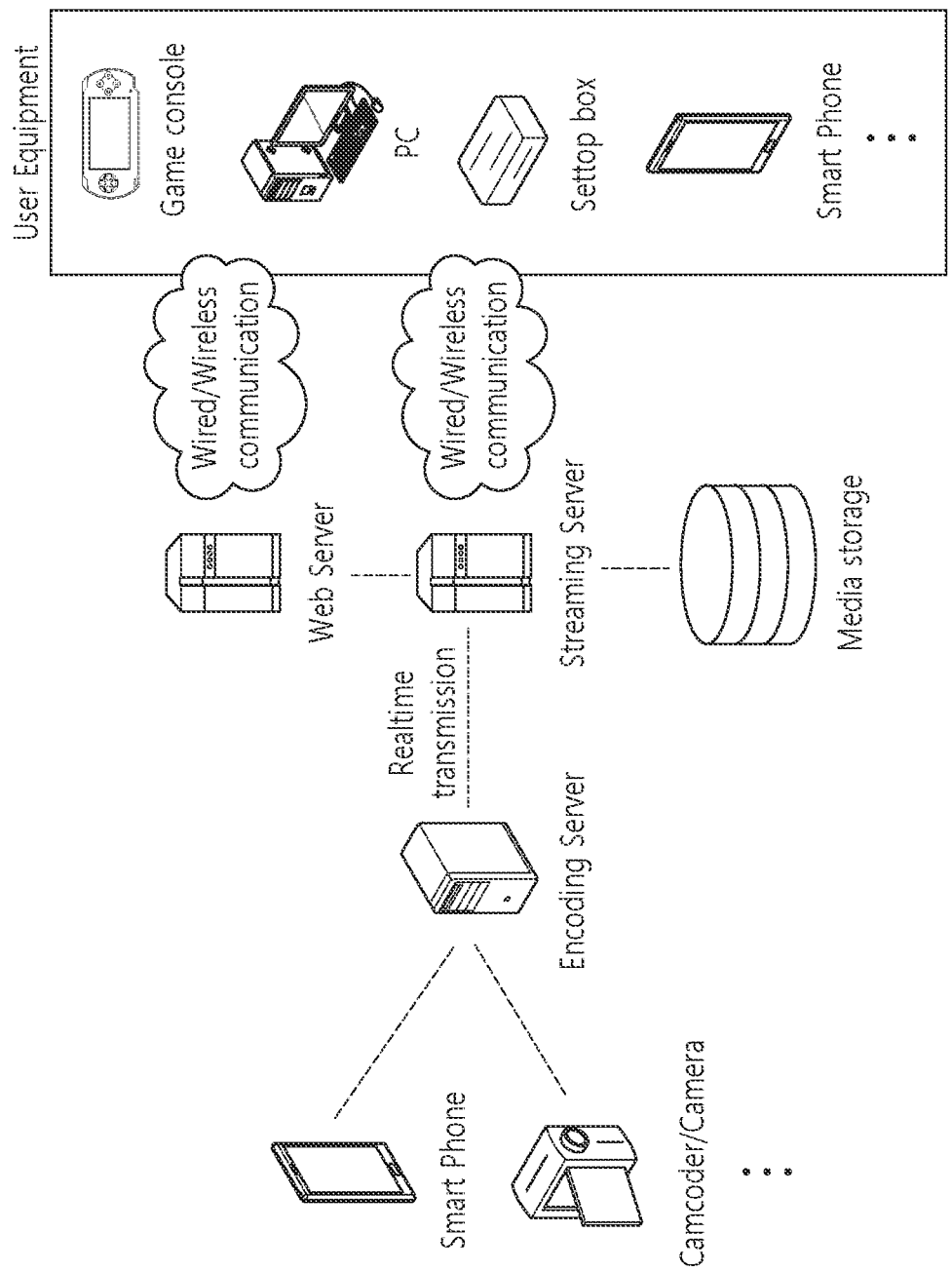
FIG. 10 shows an example of a contents streaming system to which embodiments disclosed in this document can be applied.

FIG. 10 illustrates an example of a content streaming system to which embodiments disclosed in this document may be applied.

Referring to FIG. 10, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

What is claimed is:

1. An image decoding method performed by a decoding apparatus, the method comprising:
    obtaining merge with motion vector difference (MMVD) flag information for a current block from a bitstream;
    determining whether or not the current block is a current picture referencing (CPR) coding block;
    deriving base motion information for the current block being a CPR coding block;
    deriving motion information for the current block based on the base motion information;
    generating prediction samples for the current block based on the motion information; and
    generating reconstructed samples for the current block based on the prediction samples,
    wherein the MMVD flag information is related to whether or not to derive motion information by applying MMVD to the current block,
    wherein the CPR coding block is a block coded using a current picture including the current block as a reference picture, and
    wherein whether or not to parse MMVD candidate flag information which is related to indicating one of motion information candidates for the current block is determined, based on whether or not the current block is a CPR coding block with MMVD being applied,
    wherein based on a case where MMVD is applied to the current block and the current block is a CPR coding block, the MMVD candidate flag information related to indicating one of motion information candidates for the current block is not explicitly signaled and one motion information candidate for the current block is derived as the base motion information, which is a predetermined candidate in a candidate list.

2. The image decoding method of claim 1, wherein the base motion information is a firstly-ordered candidate among motion information candidates in a merge candidate list for the current block.

3. The image decoding method of claim 1, wherein the step of the deriving the base motion information comprises obtaining MMVD candidate flag information related to indicating one of motion information candidates for the current block from the bitstream when MMVD is applied to the current block and the current block is not a CPR coding block, and
    wherein the base motion information is derived based on the MMVD candidate flag information.

4. The image decoding method of claim 3, wherein when MMVD is applied to the current block and the current block is not a CPR coding block, there are two motion information candidates for the current block, and the MMVD candidate flag information is related to indicating one of the two motion information candidates.

5. The image decoding method of claim 4, wherein the two motion information candidates are a firstly-ordered candidate and a secondly-ordered candidate in a merge candidate list for the current block.

6. The image decoding method of claim 1, wherein the determining whether or not the current block is a CPR coding block determines that the current block is a CPR coding block when only one reference picture is included in a reference picture list for the current block and the one reference picture is the current picture.

7. The image decoding method of claim 1, wherein the deriving the motion information for the current block comprises:
obtaining a distance index related to a magnitude of a motion vector difference and a direction index related to a motion direction from the bitstream, when MMVD is applied to the current block based on the MMVD flag information;
deriving motion vector difference (MVD) based on the distance index and the direction index; and
deriving a motion vector of the current block based on the base motion information and the MVD.

8. An image encoding method performed by an encoding apparatus, the method comprising:
generating merge with motion vector difference (MMVD) flag information by determining whether or not to apply MMVD to a current block;
determining whether or not the current block is a current picture referencing (CPR) coding block;
deriving base motion information for the current block being a CPR coding block;
deriving motion information for the current block based on the base motion information;
generating prediction samples for the current block based on the motion information;
deriving residual samples based on the prediction samples; and
encoding image information including information on the residual samples and the MMVD flag information,
wherein the MMVD flag information is related to whether or not to derive motion information by applying MMVD to the current block,
wherein the CPR coding block is a block coded using a current picture including the current block as a reference picture, and
wherein whether or not to explicitly signal MMVD candidate flag information which is related to indicating one of motion information candidates for the current block is determined, based on whether or not the current block is a CPR coding block with MMVD being applied,
wherein based on a case where MMVD is applied to the current block and the current block is a CPR coding block, the MMVD candidate flag information related to indicating one of motion information candidates for the current block is not explicitly signaled and one motion information candidate for the current block is derived as the base motion information, which is a predetermined candidate in a candidate list.

9. The image encoding method of claim 8, wherein the base motion information is a firstly-ordered candidate among motion information candidates in a merge candidate list for the current block.

10. The image encoding method of claim 8, wherein the step of the deriving the base motion information comprises generating MMVD candidate flag information related to indicating one of motion information candidates for the current block when MMVD is applied to the current block and the current block is not a CPR coding block, and
wherein the base motion information is derived based on the MMVD candidate flag information.

11. The image encoding method of claim 10, wherein when MMVD is applied to the current block and the current block is not a CPR coding block, there are two motion information candidates for the current block, and the MMVD candidate flag information is related to indicating one of the two motion information candidates.

12. The image encoding method of claim 11, wherein the two motion information candidates are a firstly-ordered candidate and a secondly-ordered candidate in a merge candidate list for the current block.

13. The image encoding method of claim 8, wherein the determining whether or not the current block is a CPR coding block determines that the current block is a CPR coding block when only one reference picture is included in a reference picture list for the current block and the one reference picture is the current picture.

14. The image encoding method of claim 8, wherein the deriving the motion information for the current block comprises:
generating a distance index related to a magnitude of a motion vector difference and a direction index related to a motion direction when MMVD is applied to the current block based on the MMVD flag information;
deriving motion vector difference (MVD) based on the distance index and the direction index; and
deriving a motion vector of the current block based on the base motion information and the MVD.

* * * * *